US005632389A

United States Patent [19]

Rosenband

[11] Patent Number: 5,632,389

[45] Date of Patent: May 27, 1997

[54] HIGH-DENSITY, ARCHIVE STORAGE-RACK ASSEMBLY

[75] Inventor: Phillip Rosenband, Hammond, Ind.

[73] Assignee: Morgan Marshall Industries, Inc., Chicago Heights, Ill.

[21] Appl. No.: 513,327

[22] Filed: Aug. 10, 1995

[51] Int. Cl.$^6$ .......... A47B 43/00; A47B 47/00; A47B 57/00

[52] U.S. Cl. .......... 211/187; 248/243; 108/109

[58] Field of Search .......... 211/187, 189, 211/190, 193; 248/243, 220.41, 250; 108/108, 109, 59

[56] References Cited

U.S. PATENT DOCUMENTS

| | | | |
|---|---|---|---|
| 1,875,318 | 9/1932 | Hammer | 108/109 |
| 3,102,641 | 9/1963 | Konstant et al. | 211/187 X |
| 3,168,365 | 2/1965 | Evans | 108/109 |
| 3,306,466 | 2/1967 | Liston | 248/243 X |
| 3,422,775 | 1/1969 | Johnsson | 248/243 X |
| 3,561,715 | 2/1971 | Klein | 248/243 |
| 3,606,227 | 9/1971 | Klein | 248/243 |
| 3,936,024 | 2/1976 | Jung | 248/243 |
| 4,013,022 | 3/1977 | Walter et al. | 248/243 X |
| 4,078,664 | 3/1978 | McConnell | 211/189 |
| 4,180,003 | 12/1979 | Clement | 248/243 X |
| 4,317,523 | 3/1982 | Konstant et al. | 211/187 |
| 4,553,725 | 11/1985 | Vargo | 248/221.3 |
| 4,711,183 | 12/1987 | Handler et al. | 108/111 |
| 5,265,740 | 11/1993 | Hodsden et al. | 211/187 |

FOREIGN PATENT DOCUMENTS

| | | | |
|---|---|---|---|
| 216320 | 5/1956 | Australia . | |
| 225316 | 8/1958 | Australia | 211/187 |
| 1196333 | 7/1965 | Germany | 211/187 |
| 590304 | 4/1959 | Italy | 211/187 |
| 205195 | 6/1966 | Sweden | 211/187 |
| 882460 | 11/1961 | United Kingdom | 211/187 |

OTHER PUBLICATIONS

Prior art drawing of an upright column for pallet rack, Oct. 18, 1991.

*Primary Examiner*—Ramon O. Ramirez
*Assistant Examiner*—Sandra Snapp
*Attorney, Agent, or Firm*—Milton Gerstein; Marvin N. Benn

[57] ABSTRACT

An archive, storage-rack assembly which is relatively easy to assemble, which provides considerable space-savings, which is relatively less costly to make, and which is relatively more stable. The archive storage-rack assembly of the invention is provided with four, specially-designed, corner-column supports. Operatively, and removably, associated therewith are shelf-clip units for supporting shelves. Each shelf-clip unit is one integral unit having two, end clip-sections for placement into respective openings of two, corner-column supports and for supporting a shelf-corner, an elongated, reinforcing angle-bracket section integral with, and interconnecting, the two, end-clip sections, and an elongated, box-guide section integral with, and projecting upwardly from, the elongated, reinforcing angle-bracket section. Each clip-assembly has a length extending in the direction of the depth of the rack-assembly, with a lateral pair of end-column supports supporting it via the two, integral, end-clip sections. Since the clip-assembly is one, complete, integral unit, it is assembled directly to the column-supports, after which, a shelf is placed thereon, in contrast to the prior art, where the individual component parts must first be fastened to the shelf proper.

18 Claims, 5 Drawing Sheets

HIGH-DENSITY, ARCHIVE STORAGE-RACK ASSEMBLY

BACKGROUND OF THE INVENTION

The present invention is directed to a storage rack assembly having a plurality of horizontal shelves which are used for supporting and storing archive-boxes, which boxes are typically filled with old books, manuscripts, papers, and the like. These archive storage-rack assemblies are typically placed in large warehouses, or archives, usually at colleges, universities, government agencies, and the like. The height of each storage-rack assembly approaches the height of the ceiling of the archive-building itself, in order to maximize storage-capacity. In fact, it has been found that by a space-saving of just a fraction of an inch on each supporting rack of a storage-rack assembly, the total storage-capacity of the entire archive-warehouse may be considerably increased, which can lead to considerable cost-savings.

The conventional, prior-art, archive storage-rack assembly utilizes a series of horizontal shelves supported by four corner-columns. Each shelf, in turn, has individual, separate, elongated shelf-reinforcement angle-brackets and elongated box-guides, with one such angle-bracket and one such box-guide being operatively associated with each of the two, supported, lateral ends of the shelf. Each angle-bracket is placed interiorly of the respective shelf-end, while the associated box-guide is placed exteriorly of the respective shelf-end, with the respective angle-bracket and box-guide sandwiching therebetween the shelf-end and fastened thereto via rivets. The box-guide projects upwardly to provide a vertical surface against which archive storage-boxes are aligned during storage on the shelf. Each shelf of the assembly is supported at its four corners via four, separate, removable shelf-clips, each of which has a lower, main portion supported by fingers received in holes formed in a respective corner-column, and an upper shelf-engaging portion that projects into slots formed in the corners of the shelf, whereby the shelf is supported.

The above-described, prior-art, archive storage-rack assembly suffers from many disadvantages. Firstly, it is a difficult task to pre-assemble each shelf with its associated angle-brackets and box-guides. Secondly, once assembled, this shelf-combination is cumbersome to emplace on the rack-assembly, owing to the greater weight and bulk thereof. Thirdly, and very importantly, the prior-art assembly's box-guides and lower, main portions of the shelf-clips take up valuable space that could otherwise be used as actual storage space. Fourthly, the prior-art assembly is relatively costly to produce and less stable as compared to the rack-assembly of the present invention.

SUMMARY OF THE INVENTION

It is the primary objective-of the present invention to provide an archive, storage-rack assembly which is relatively easy to assemble, which provides considerable space-savings, which is relatively less costly to make, and which is relatively more stable.

Toward these and other ends, the archive storage-rack assembly of the invention is provided with four, specially-designed, corner-column supports, or posts, with each, two, lateral pairs of corner-column supports being provided with cross-bracing for enhanced stability and structural integrity. Unlike the prior-art assemblies, each, lateral pair of corner-column supports has operatively, and removably, associated therewith a shelf-clip assembly, which shelf-clip assembly is one integral unit having two, end clip-sections for placement into respective openings of the two, corner-column supports and for supporting a shelf-corner, an elongated, reinforcing angle-bracket Section integral with, and interconnecting, the two, end-clip sections, and an elongated, box-guide section integral with, and projecting upwardly from, the elongated, reinforcing angle-bracket section. Each clip-assembly has a length extending in the direction of the depth of the rack-assembly, with a lateral pair of end-column supports supporting it via the two, integral, end-clip sections. Since the clip-assembly is one, complete, integral unit, it is assembled directly to the column-supports, after which, a shelf is placed thereon, in contrast to the prior art, where the individual component parts must first be fastened to the shelf proper. Since the clip-assembly is one integral, holistic unit, the end-clip sections, with their rearwardly-projecting fingers, which are inserted into holes of the end column-supports, project in the same, upward direction as the elongated box-guide, whereby the space below each shelf adjacent the edge-surface of the respective corner-column is free and unoccupied, in contradistinction to the prior art, to, thus, provide additional storage space which has hitherto been taken up by the downwardly-extending main sections of the prior-art shelf-clips. Although the volume freed by the shelf-clip of the invention amounts to only a fraction an inch, when extrapolated over many shelves, the space-saving achieved by the invention is considerable. The end-column supports of the invention are also an improvement over the prior art.

BRIEF DESCRIPTION OF THE DRAWINGS

The invention will be more readily understood with reference to the accompanying drawing, wherein.

DETAILED DESCRIPTION OF THE INVENTION

Figure 1:
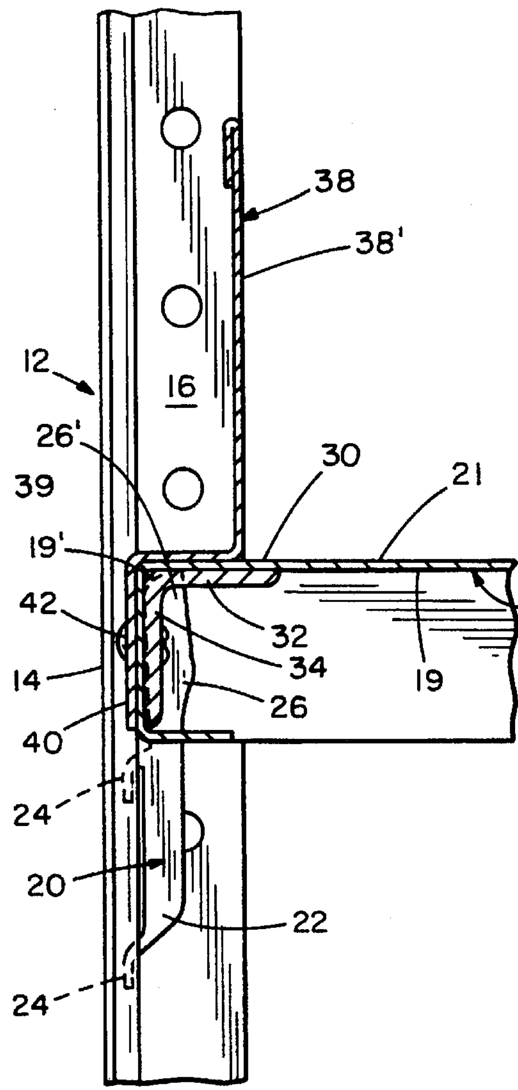
FIG. 1 is a side, elevational view, partially in cross section, showing a prior-art, archive, storage-rack assembly with separate shelf-clips, box-guide and angle-bracket.
Figure 2:
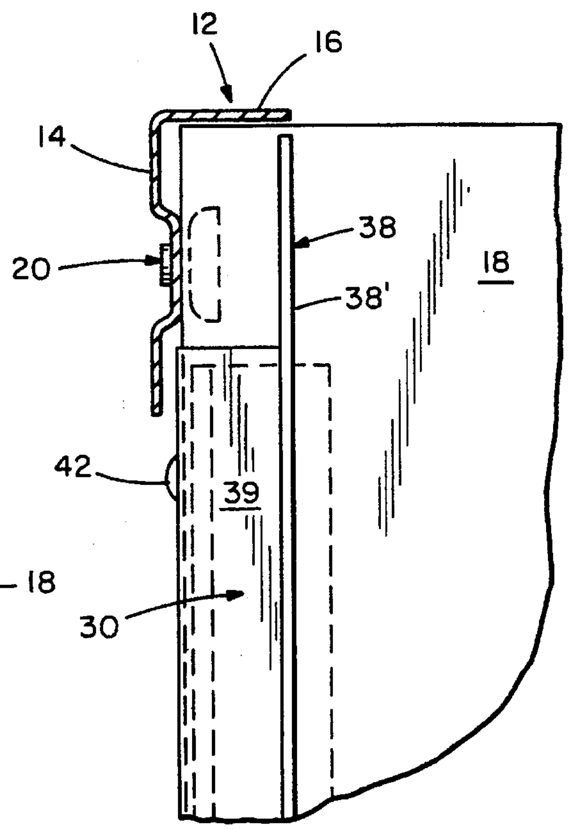
FIG. 2 is top, plan view thereof, in partial cross section.

Referring now to the drawings in greater detail, FIGS. 1 and 2 show a prior-art, archive storage-rack assembly 10, upon which the present invention is an improvement. The prior-art, archive, storage-rack assembly 10 includes a main frame made up of four corner-columns 12. Each corner-column 12 is comprised of a right-angle piece having a first, vertical column-section 14, and a second, vertical column-section 16. Each corner-column helps to support a plurality of horizontal, vertically-spaced-apart storage-shelves 18, only one being shown in the drawing. The corner-columns 12 are arranged in pairs, in that the two corner-columns supporting the same end of a shelf are buttressed together via braces to form one unit comprised of a pair of corner-columns 12, by which added stability and strength is achieved. Each corner-column 12 projects substantially upwardly from the floor of the archive-warehouse, and in close proximity, to the ceiling thereof. Upon each shelf 18 there are arranged and supported archive storage-boxes, containing old books, manuscripts, papers, and the like, to be warehoused. Typically, the archive-warehouse is part of a university, college, government agency, and the like. In the prior-art structures, in order to support the ends of each shelf via the corner-columns 12, there are provided a plurality of individual, separate shelf-clips 20. Each shelf-clip 20 has a downwardly-extending, main portion 22, from the rear of which project a plurality of bent pieces, or tongues, 24, which extend outwardly and downwardly at an acute angle with respect to the vertical plane of the rear surface of the main section 22. These tongues 24 are spaced a specific, vertical distance apart from each other, in order to match the vertical spacing between the holes formed in the corner-column section 14 for passage therethrough, whereby each shelf-clip is firmly held and supported by a respective corner-column. Projecting upwardly from the main section 22 is a shelf-engaging finger, or projection, 26, which projects upwardly through a slot formed in the bottom corner of each shelf 18 adjacent each end of the shelf. The finger 26 projects substantially upwardly through the interior of the shelf-end, until the top, supporting surface 26' thereof abuts up against the interior, lower surface 19 of the upper section of the respective end of the shelf, with the rear face of the finger 26 (shown in dotted lines in FIG. 1) abutting against the interior-facing side-surface of the end wall 19. With four such shelf-clips 20 provided per shelf, the four corners of the shelf 18 are, thus, supported thereby.

In order to reinforce the substantially hollow shelf 18, there are provided two, shelf-reinforcing angle-brackets 30, one such angle-bracket 30 for each end of a shelf that is engaged and supported by two shelf-clips 20. Each angle-bracket 30 extends along the depth of the frame; i.e., each angle-bracket extends in the direction from the front toward the rear of the pair of corner-columns 12 which are buttressed, or connected, together. Each angle-bracket 30 has an upper, horizontal section 32 which engages against the interior, lower surface 19 of the upper section of the respective end of the shelf, and a lower, vertical section 34 that engages against the interior-facing side-surface of the end wall 19'. The length of each angle-bracket 30, as seen in FIG. 2, is less than the length of the end of the shelf proper, so that the interior, lower surface 19 and the interior side-surface of the end-wall 19' have ample room for the reception of, and engagement with, the top and rear surfaces of the corner-fingers 26 of the shelf-clips 20, respectively.

Figure 3:
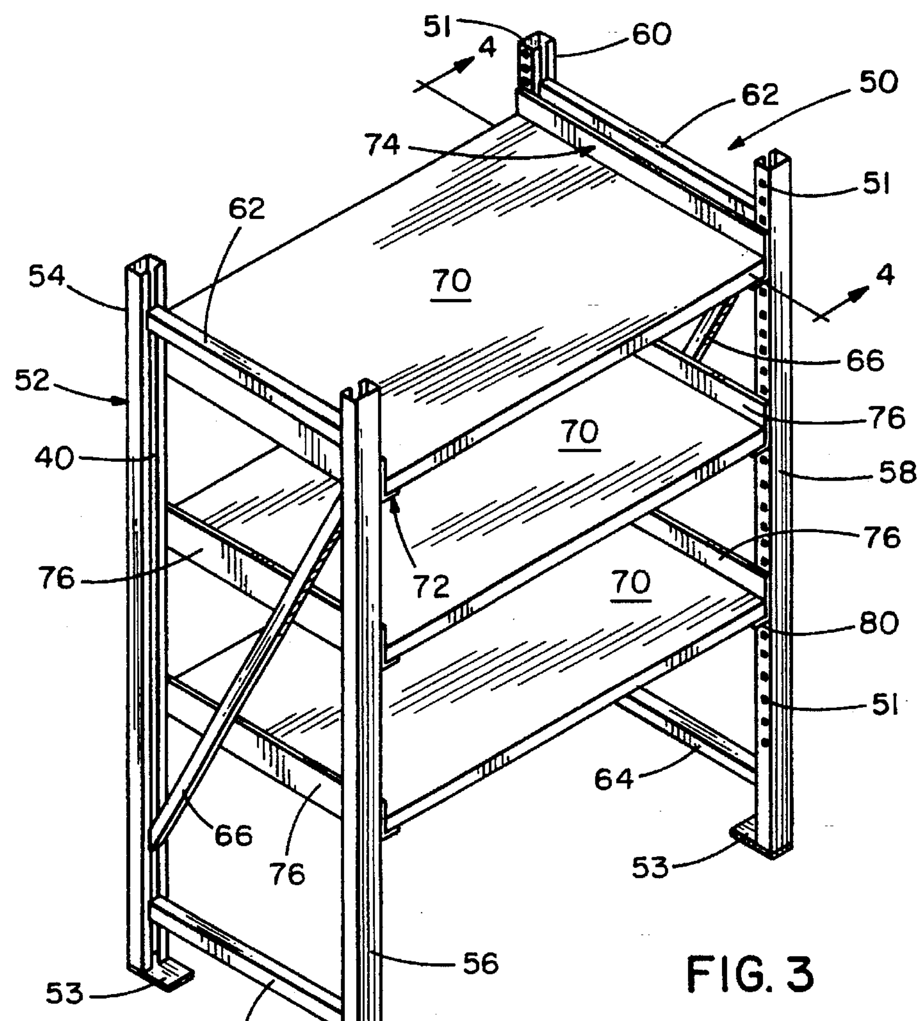
FIG. 3 is a perspective view of the archive, storage-rack assembly of the present invention.
Figure 4:
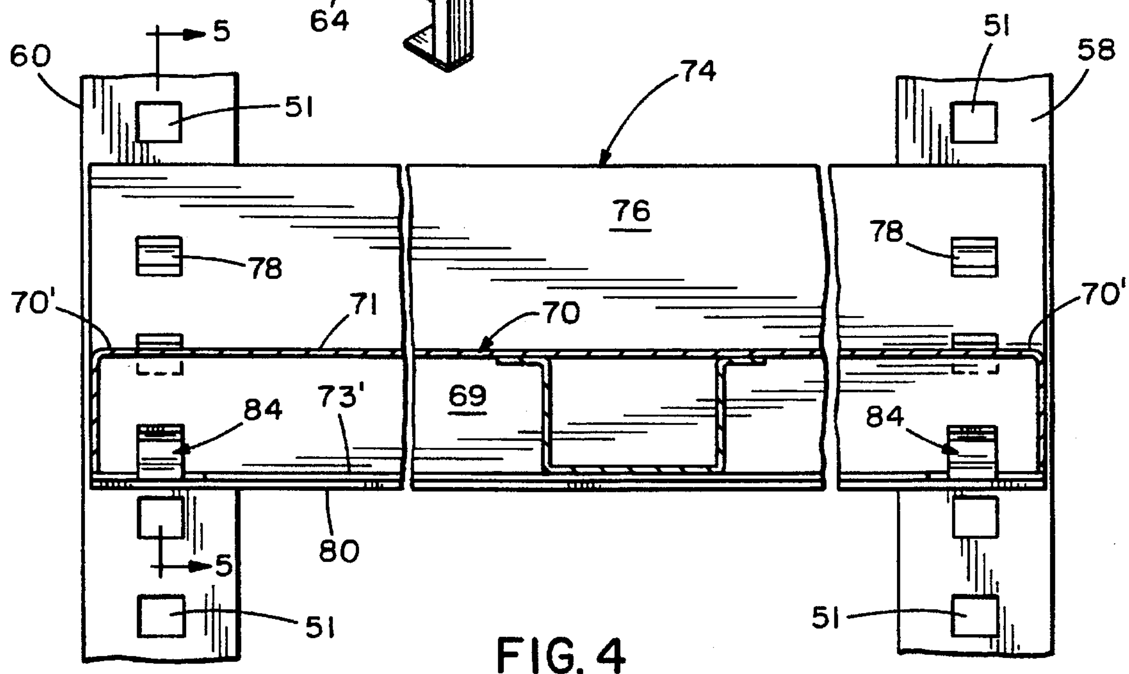
FIG. 4 is a cross-sectional view taken along line 4—4 of FIG. 3.
Figure 9:
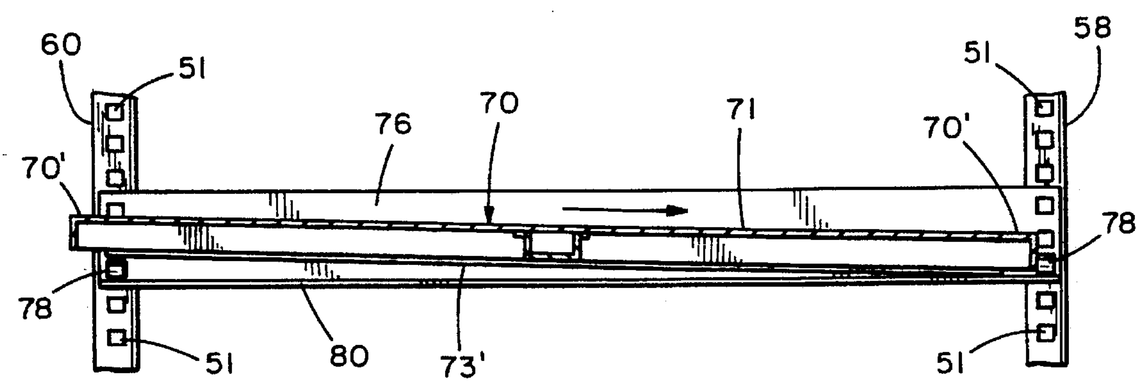
FIG. 9 is a front, elevational view, in partial cross section, showing a shelf partially supported at one end of the shelf-clip assembly unit of the archive, storage-rack assembly of the invention, during installation.
Figure 10:
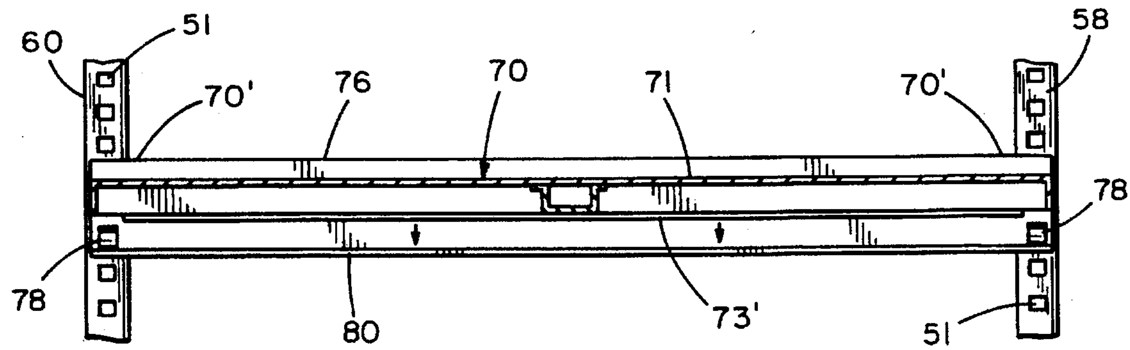
FIG. 10 is a front, elevational view, in partial cross section, portion showing the shelf of FIG. 9 fully supported at both ends of the shelf-clip assembly unit of the archive, storage-rack assembly of the invention, after installation.
Figure 11:
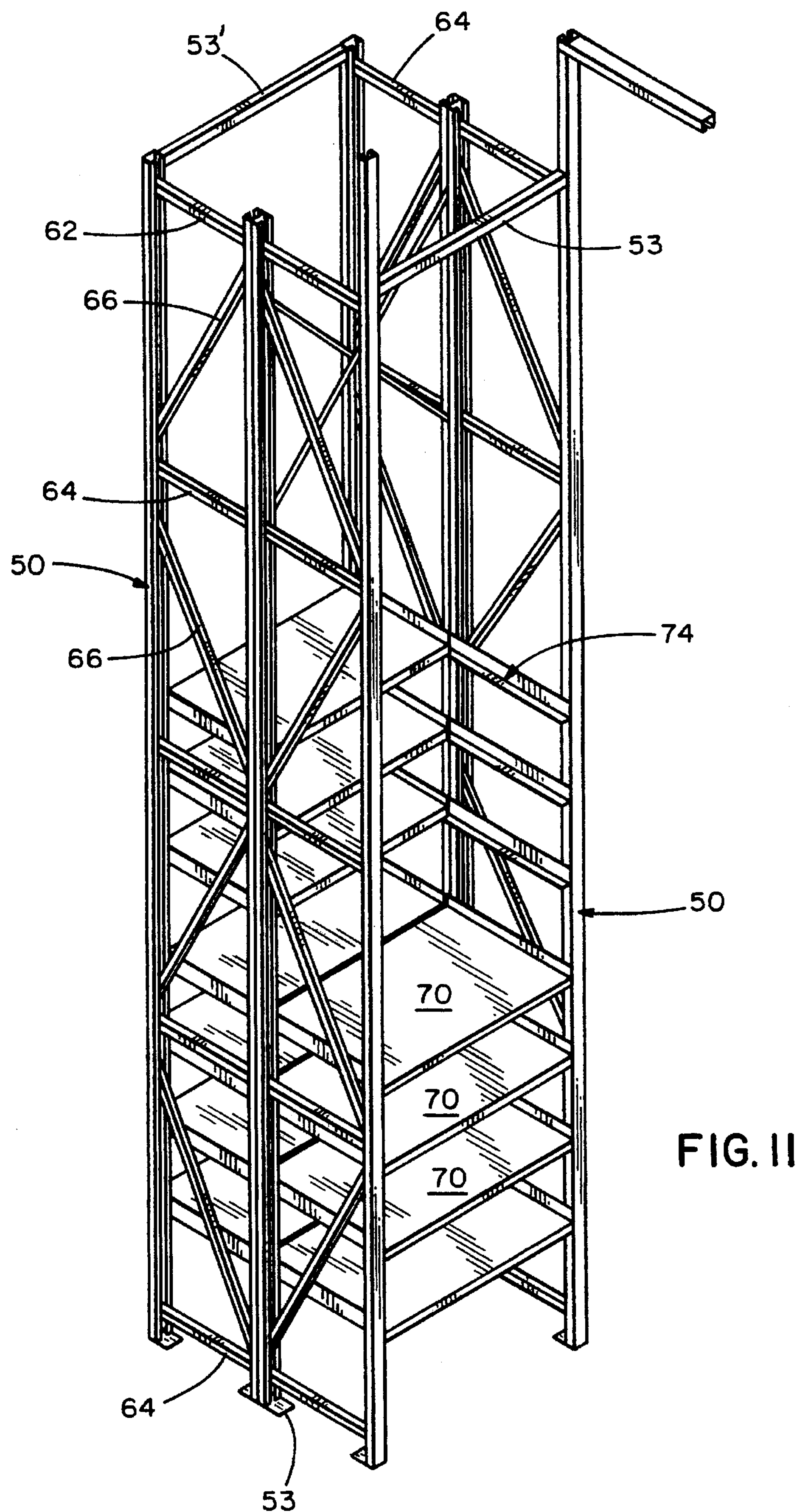

Also associated with each, supported end of the shelf 18 is an elongated, box-guide member 38. The box-guide member 38 has an upper, vertical, flat section 38' that projects above the upper surface 21 of the shelf, which upper section 38' serves as a guide for the boxes placed on the shelf adjacent an end thereof. The vertical section 38' allows one to push each archive-box rearwardly into the depth of the shelf, while ensuring that the archive-box remains properly aligned and squared, in order to achieve the maximum, storage capacity. Of course, the vertical section 38' also serves as an end wall for preventing the boxes on the shelves from accidentally falling off the ends of the shelves during and after placement on a shelf. The box-guide member 38 also has a middle, horizontal, transitional section 39 that abuts against a portion of the upper surface 21 at the end of the shelf, which transitional section 39 turns into a lower, vertical, fastening section 40 which is parallel to, and abuts against, the outer, lateral surface of the end-wall 19' for approximately the height thereof, as seen in FIG. 1. The overall length of the upper, vertical section 38' is greater than the sections 39, 40, as seen in FIG. 2, so that the interior, lower surface 19 and the interior-facing side-surface of the end-wall 19' have ample room for the reception of, and engagement with, the top and rear surfaces of the corner-fingers 26 of the shelf-clips 20, respectively, as described above. The box-guide member 38 and the angle-bracket 30 for each, supported end of the shelf are affixed to the respective shelf-end via rivets 42, or the like, with each rivet passing through a portion of the end-wall 19' sandwiched between the lower sections 34 and 40 of the angle-bracket and box-guide member, respectively, Referring now to FIGS. 3–11, the archive, storage-rack assembly of the invention is shown, and indicated generally by reference numeral 50. The assembly 50 has a main, supporting frame 52 made up of four, vertical corner-supports, or posts, 54, 56, 58, and 60. These posts differ from the corner-columns described above with respect to the prior art. Each, vertical post 54, 56, 58, 60 has a substantially quadrilateral cross section, with a series of equally-spaced holes 51 formed along the interior-facing, vertical surface thereof, as seen in FIGS. 3, 4, 6, 9 and 10. The lower end of each post has an enlarged base-member 53, with the base-members of the posts 54, 56 projecting toward each other, and the base-members of the posts 58, 60 projecting toward each other, as clearly seen in FIG. 3, whereby the main frame is stabilized. The posts 54, 56 form one unit-pair of posts and are connected together by horizontal cross-beam members 62, 64, and angled brace-member 66. The two posts 58, 60 are similarly connected and reinforced. To accommodate these bracing members, the mutually-facing surfaces of the two posts of each unit-pair are provided with an elongated, vertical groove, or slot 51', as seen in FIG. 3, by which the ends of bracing members enter into the hollow interior of the respective post, for fixed anchoring therein by any conventional technique. The number of cross braces 62, 64, and angle-braces 66 may, of course, be many more, depending upon the overall height of the assembly 50. Typically, the assembly 50 will extend from the floor to the ceiling of an archive-warehouse, so that the height of the posts 54, 56, 58, 60 will be very great, requiring the bracing pattern 62, 64, 66 repeated many times over along the full height of the assembly. In addition, of course, the archive-warehouse will have many like-assemblies 50 placed therein. Typically, the assemblies 50 will be placed back-to-back in pairs, as it is conventionally known to do. FIG. 11 shows such a pairing of assemblies 50. It will be noted that each assembly of FIG. 11 is of a very great height, with the repeating, bracing pattern above-described shown in detail. At the top of such a structure, rigidity beams 53' are provided, which run perpendicular to the length of the horizontal cross-braces 62, 64.

Figure 5:
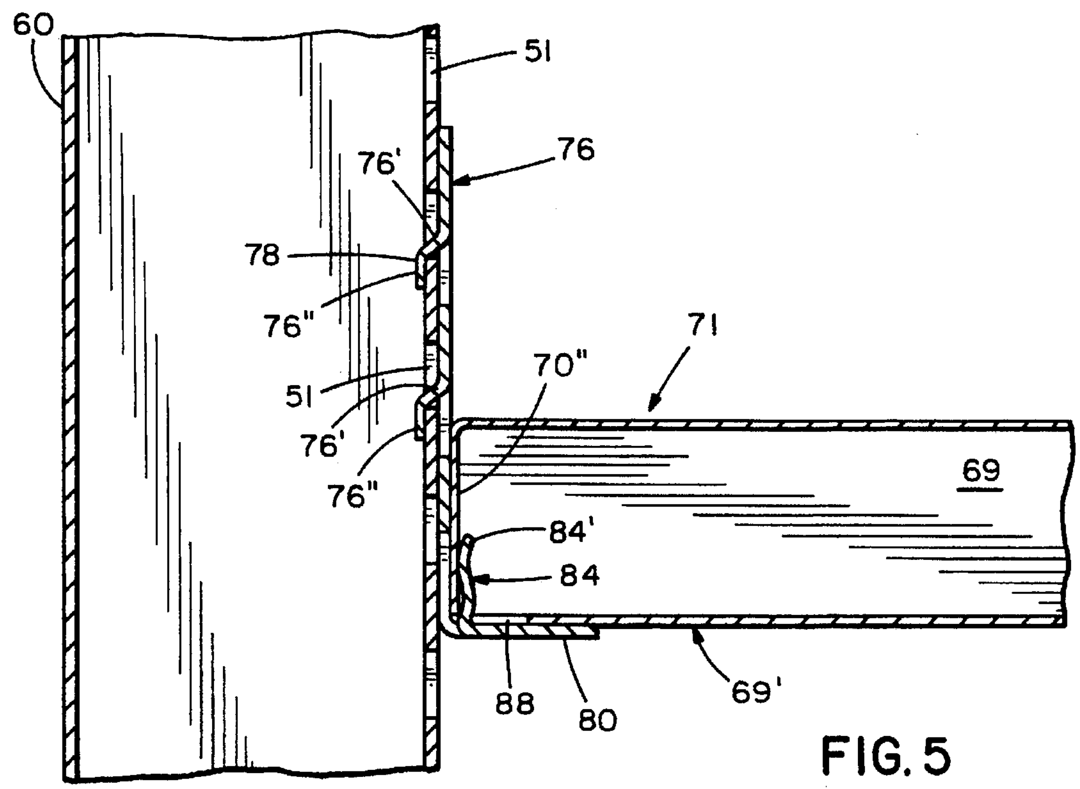
FIG. 5 is a cross-sectional view taken along line 5–5 of FIG. 4.

The assembly 50 supports a plurality of horizontal shelves 70 by means of two-clip-units 72, 74. Each shelf clip-unit 72, 74 is best seen in FIGS. 4–7, and includes elongated, vertical, securing portion 76 in which are cut, or punched, exteriorly-projecting tongues, or fingers, 78 at each end of the securing portion 76. In the preferred embodiment, two such fingers 78 are provided at each end in a vertical row, with the fingers 78 being spaced vertically apart to correspond to the vertical spacing between the holes 51 formed in the lateral, interior-facing, vertical surfaces of the four corner-post posts 54, 56, 58, 60. Each securing portion 76 has a first, downwardly-sloping section 76' which turns into a substantially vertical section 76". The sloping section 76' projects through a respective one of the holes 51 of a respective corner-post with which it is associated, while the vertical section 76" abuts against, and engages, the interior wall of the corner-post between adjacent holes 51, as best seen in FIG. 5. Each clip-unit 72, 74 is supported by two corner-posts 54, 56 and 58, 60, respectively, by aligning the ends thereof with the posts, so that the vertical sections 76" of the securing portions 76 are positioned directly in front of holes, after which the clip-unit is pushed against the respective posts and forced downwardly so that the vertical sections 76" enter into the holes aligned therewith, and then grab the interior wall of the post, as the unit is forced downwardly.

Figure 6:
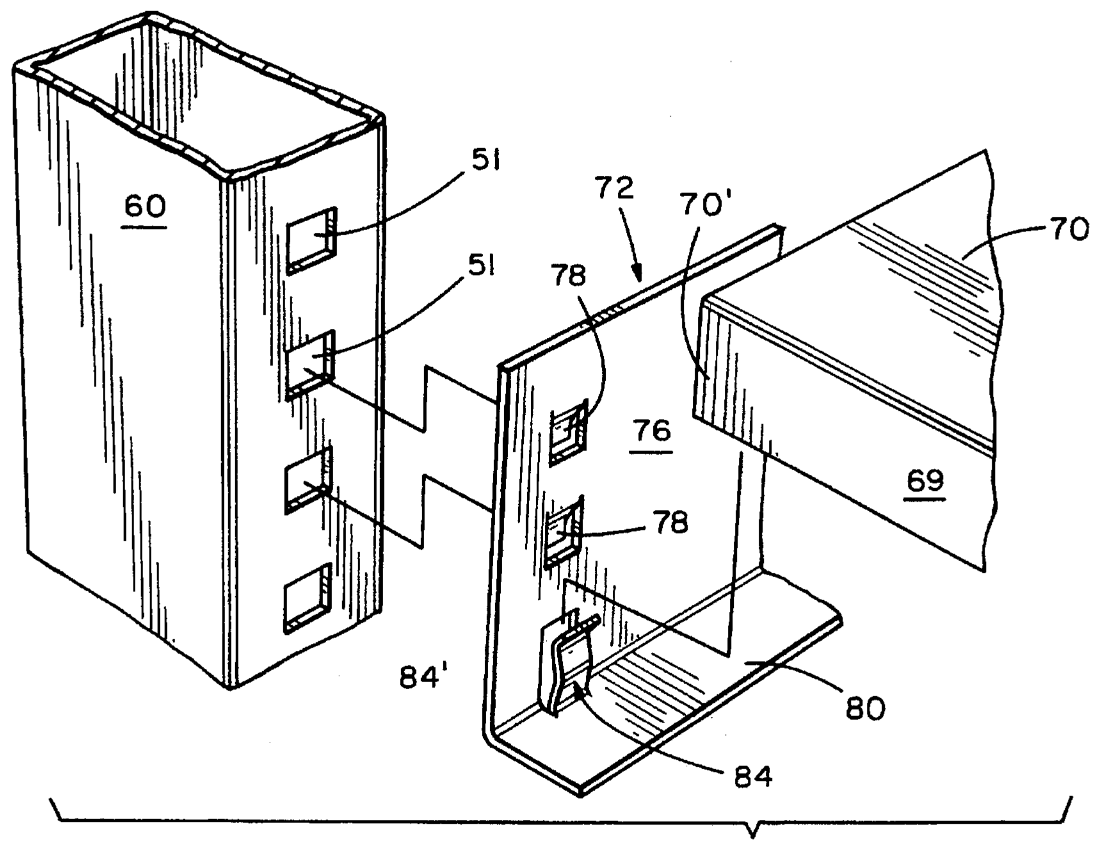
FIG. 6 is an assembly view, in perspective, showing the assembly of a shelf-clip unit of the invention to a corner end-post, and assembly of a shelf to the shelf-clip unit.
Figure 7:
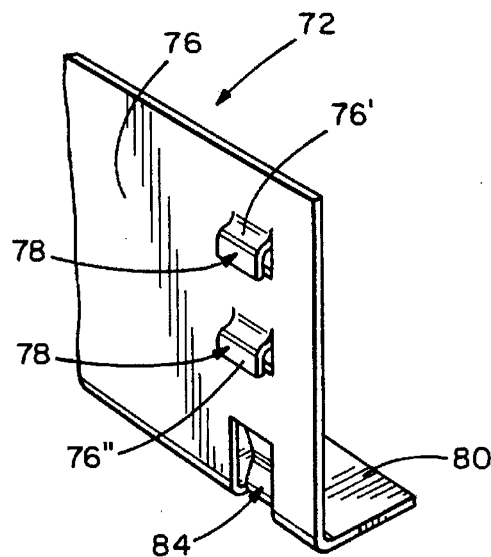
FIG. 7 is a perspective view of the shelf-clip assembly unit of the invention.
Figure 8:
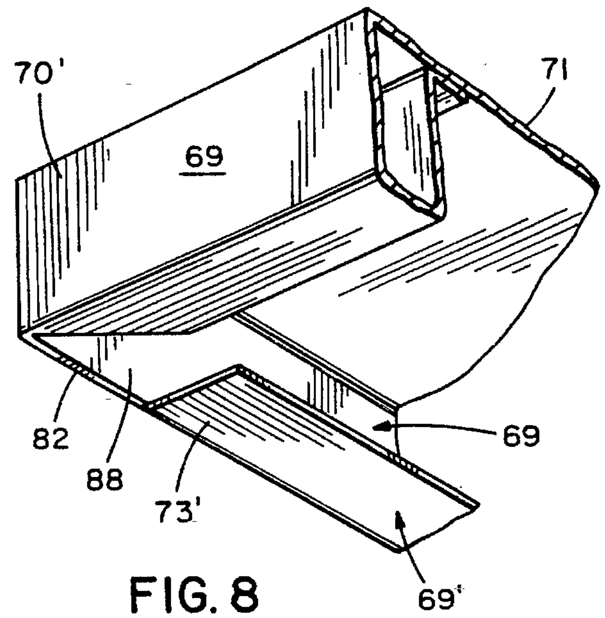
FIG. 8 is bottom, perspective view of a shelf for use in the archive, storage-rack assembly of the invention.

Each clip-unit 72, 74 also has an elongated, lower, horizontal, shelf-supporting portion 80, upon which rests, and is supported, the bottom of an end 70' of a shelf 70. Each shelf 70 has a top surface 71, an annular, side surface 69 extending downwardly from the circumferential edge of the top surface 71, and a horizontal, partially-interrupted, annular, bottom lip 69', as seen in FIG. 8. As seen in FIGS. 5 and 6, each shelf-end 70' is made up of a lateral end-wall 70" forming part of the annular, side surface 69, and the adjoining sections of the top surface and bottom lip. The horizontal, shelf-supporting portion 80 contacts and supports bottom surface 73' along the length thereof, which surface 73' is part of the annular, bottom lip extending depth-wise along the shelf, in a direction between the two corner posts of a unit-pair of corner-posts. The shelf-supporting portion 80 also contacts, and supports, the length of the lower edge-surface 82 of the lateral end-wall 70", as seen in FIGS. 5 and 8 Projecting upwardly at each end of each clip-unit 72, 74, is a vertical, retaining tongue-clip, or ear, 84, which tongue-clip 84 is in vertical, center alignment with the holes 51 of the main portion 76 of the respective end of the clip-unit 72 or 74. Each tongue-clip 84 is cut, or punched, from a bottom section of the end of the main portion 76 and a rear section of the horizontal, shelf-supporting portion 80, as best seen in FIG. 6, whereby there is provided an entrance for the insertion and reception of the thickness of lateral end-wall 70" of a shelf-end 70', by which the shelf-end is retained. In order to allow for the insertion of each tongue-clip 84 into the hollow interior of a shelf, each shelf-end 70' is provided with a lower, corner-opening 88, best seen in FIG. 8, which opening 88 is formed by the interruption of the bottom, annular lip 69 at the bottom, four corners of the shelf. Each tongue-clip 84 is formed into a wave-shape, or sinusoidal-shape, to form an exteriorly-facing bent-portion 84' whose apex actually contacts a portion of the interior-facing surface of the lateral end-wall 70". This shape of the finger-clip increases the resilient, retention-capacity of the clips by causing clockwise, pivotal movement of the finger-clip, when viewing FIG. 5, as a lateral end-wall 70" is inserted therepast.

It will be noted that the clip-unit of the invention performs all of the functions of the prior-art assemblies, but in a much easier, safer, and stable way, in addition to performing other functions not performed by the prior art, as set forth infra. The main, elongated portion 76 not only serves as the means for mounting the fingers 78 for insertion into holes 51, but also serves as the box-guide via the portion thereof protruding above the top surface 71, as seen in FIG. 5. The horizontal portion 80 serves the shelf-reinforcement function of the prior art, in addition to providing part of the tongue-clip 84 by which the shelf proper is actually supported. The tongue-clips 84 serve the function of the supporting clips of the prior art, but without the downwardly-projecting mounting section of the prior art used for mounting the clip to a corner-column. Thus, it may be seen that the clip-unit of the invention not only performs all of the functions performed by the prior art, but does so in a much better, easier and more productive manner.

The additional advantages of the clip-unit of the invention are as follows. The shelf 70 itself need not be pre-assembled prior to its emplacement in the archive-rack assembly, whereas in the prior art, both the box-guide and the shelf-reinforcement member had to be affixed to each, lateral shelf-end before emplacement. This aspect of the invention which is not only time-saving and cost-saving, but also allows for a lighter-weight shelf Unit for easier handling. In addition, since the main, elongated portion 76 not only serves as a box guide and a mounting frame for attachment to a corner-post, but also contains the shelf-finger-clips 84 proper, there is no downwardly-projecting mounting section for the clip 84, as is present in the prior art, which prior-art, downwardly-extending mounting section takes up valuable storage-space. Moreover, since the corner-posts of the invention are quadrilateral in cross section, and not a right-angle piece column of the prior art, the box-guide portion of the main elongated portion 76 of the clip-unit of the invention may lie flush against the interior-facing, lateral face of a corner-post 54, 56, 58, 60 of the invention, which is not the case in the prior art. This flush mounting of the invention increases the amount of available storage-space on the shelves, and allows the entire length of the shelf to be available for supporting boxes, unlike the prior art, where the lateral ends of each shelf were used up for mounting the individual, separate box-guide members and shelf-reinforcing members. In addition, whereas in the prior art, each independent, shelf-engaging clip must be made substantially long, wide and thick, since it supports the weight of a shelf-corner by engaging against a lower surface portion of the top surface of the shelf, the tongue-clips of the clip-unit of the invention need only be made relatively shorter, narrower, and thinner, since the weight of the shelf is borne by the entire clip-unit of the invention, including the shelf-reinforcement supporting portion 80.

One additional, and very important, advantage of the invention is that each shelf 70 may be emplaced in the frame by just one person, since the-shelf-supporting portion 80 of each clip-unit extends along the full depth of the frame. As is depticted in FIG. 9, one person may slide a shelf 70 rearwardly into the depth of the frame by resting the rear part of the shelf on the pair of opposite shelf-supporting portions 80, and, while lifting the forward part of the shelf, pushed the shelf rearwardly until the front and rear corners are aligned with the front and rear exteriorly-projecting tongues 84, respectively, at which point the shelf is dropped in place, with the tongues 84 entering into the interior of the shelf via the openings 88, as described above. It is noted, the front-corner tongues 84 serve as rests upon which the lower bottom-lip surface 73' may rest as the shelf is pushed rearwardly into the frame, as seen in FIG. 9, which allows the person to rest at intervals, if desired. FIG. 10 shows a shelf 70 at the end of its insertion, when the corners thereof are vertically aligned above the exteriorly-projecting tongues 78.

While a specific embodiment of the invention has been shown and described, it is to be understood that numerous changes and modifications may be made therein without departing from the scope, spirit and intent of the invention as set forth in the appended claims.

What I claim is:

1. A storage rack-assembly for mounting at least one shelf, comprising:

a main frame comprising four, upstanding corner-posts; each said corner-post comprising a surface having a plurality of vertically-aligned holes formed therein;

a pair of shelf-clip mounting means for mounting a shelf having corners for support, each one of said pair of shelf-clip mounting means being operatively associated with and mounted by a separate pair of said corner-posts, so that the ends of the shelf may be supported by the spaced-apart, shelf-clip mounting means;

each one of said pair of shelf-clip mounting means comprising a substantially vertical, main, elongated portion having a first end, a second end, an exterior-facing surface, and an interior-facing surface; each of said first and second ends of said main elongated portion having retaining means projecting from said exterior-facing surface thereof for reception in at least one hole of a respective said corner-post, whereby said shelf-clip mounting means is removably mounted to said pair of corner-posts;

each one of said pair of shelf-clip mounting means further comprising a substantially horizontal, shelf-supporting member having an upper surface projecting from said main, elongated portion upon may be supported an end of the shelf;

each one of said pair of shelf-clip mounting means further comprising a pair of shelf-end clip means for insertion into the corners of the shelf to be supported; each said, shelf-clip mounting means comprising an upstanding member projecting upwardly from a portion of said substantially horizontal, shelf-supporting member and spaced horizontally from said interior-facing surface of said substantially vertical, main, elongated portion.

2. The storage rack-assembly according to claim 1, wherein said substantially vertical, main, elongated portion has a height greater than the thickness of the shelf to be operatively mounted thereby in order to provide a projecting section thereof that projects beyond a horizontal plane of the of the top surface of the shelf mounted thereby; said projecting section being a box-guide member for guiding boxes to be stored on the upper surface of the shelf and for preventing the falling off of the boxes.

3. The storage rack-assembly according to claim 1, wherein said retaining means projecting from each said end of said exterior-facing surface comprises a plurality of vertically-aligned finger-members for reception in a plurality of said holes of a respective said corner-post.

4. The storage rack-assembly according to claim 3, wherein each said finger-member comprises a first, downwardly-sloping section, and a second, substantially vertical section; said vertical section gripping a portion of said exterior-facing surface below the respective hole thereof through which passes said finger-member.

5. The storage rack-assembly according to claim 1, wherein said main frame further comprises first and second bracing means for tying together the corner-posts of each each said separate pair of said corner-posts which mount one said shelf-clip mounting means; said first bracing means connecting the corner-posts of one said separate pair of corner-posts, and said second bracing means connecting the corner-posts of the other said separate pair of corner-posts.

6. The storage rack-assembly according to claim 1, wherein said upstanding member of said shelf-end clip means comprises a bent section defining shelf-end engaging portion, so that, during the mounting of the shelf, said clip means is partially pivoted away from said main, elongated portion of said shelf-clip mounting means by contact of the shelf-end with said engaging portion, whereby the retentive, biassing force of said clip means is increased.

7. The storage rack-assembly according to claim 1, wherein each said corner-post is hollow and substantially quadrilateral-shaped in cross section comprising four, substantially vertical surfaces; a first said vertical surface comprising a groove formed for allowing entry to the hollow interior thereof; a second said surface being said surface having said plurality of vertically-aligned holes formed therein.

8. The storage rack-assembly according to claim 7, wherein said second surface of each said corner-post of one said separate pair of corner-posts faces interiorly toward said second surface of the corresponding said corner-post of the other said separate pair of corner-posts.

9. The storage rack-assembly according to claim 7, wherein said first surface of each said corner-post of each said separate pair of corner-posts faces toward said first surface of the other said corner-post of the same said separate pair of corner-posts.

10. The storage rack-assembly according to claim 8, wherein said first surface of one said corner-post of each said separate pair of corner-posts faces toward said first surface of the other said corner-post of the same said separate pair of corner-posts.

11. The storage rack-assembly according to claim 9, wherein said main frame further comprises first and second bracing means for tying together the corner-posts of each each said separate pair of said corner-posts which mount one said shelf-clip mounting means; said first bracing means connecting the corner-posts of one said separate pair of corner-posts, and said second bracing means connecting the corner-posts of the other said separate pair of corner-posts; said grooves of said first surfaces of said corner-posts passing therethrough respective ends of said first and second bracing means for entry of said ends into the hollow interior of said corner-posts for fixed securement therein.

12. The storage rack-assembly according to claim 1, comprising a plurality of pairs of shelf-clip mounting means for mounting a plurality of shelves for support.

13. The storage rack-assembly according to claim 12, wherein said corner-posts have a height extending from a floor of a room in which said main frame is situated to close proximity to a ceiling of the room, whereby an archive-storage assembly is provided.

14. A shelf-clip support for mounting a shelf, comprising:

a substantially vertical, main, elongated portion having a first end, a second end, an exterior-facing surface, and an interior-facing surface; each of said first and second ends of said main elongated portion having retaining means projecting from said exterior-facing surface thereof for reception in at least one hole of a corner-post of an assembly-rack frame;

a substantially horizontal, shelf-supporting member having an upper surface projecting from said main, elongated portion upon which may be supported an end of a shelf having corners and a top supporting surface;

and a pair of shelf-end clip means for insertion into a corner of the shelf to be supported; each said shelf-clip mounting means comprising an upstanding member projecting upwardly from a portion of said substantially horizontal, shelf-supporting member and spaced horizontally from said interior-facing surface of said substantially vertical, main, elongated portion.

15. The shelf-clip support according to claim 14, wherein said substantially vertical, main, elongated portion has a height greater than the thickness of the shelf to be operatively mounted thereby, in order to provide a projecting section thereof that projects beyond a horizontal plane of the top surface of the shelf mounted thereby; said projecting section being a box-guide member for guiding boxes to be stored on the top surface of the shelf and for preventing the falling off of the boxes.

16. The shelf-clip support according to claim 14, wherein said retaining means projecting from each said end of said exterior-facing surface comprises a plurality of vertically-aligned finger-members for reception in a plurality of said holes of a respective said corner-post.

17. The shelf-clip support according to claim 16, wherein each said finger-member comprises a first, downwardly-sloping section, and a second, substantially vertical section for insertion into openings of a corner-post of a rack-assembly.

18. The shelf-clip support according to claim 14, wherein said upstanding member of each said shelf-end clip means comprises a bent section defining shelf-end engaging portion, so that, during the mounting of the shelf, said clip means is partially pivoted away from said main, elongated portion of said shelf-clip mounting means by contact of the shelf-end with said engaging portion, whereby the retentive, biassing force of said clip means is increased.

* * * * *